United States Patent
Hayashi

(10) Patent No.: US 7,075,686 B2
(45) Date of Patent: Jul. 11, 2006

(54) CARRIAGE SUPPORT STRUCTURE FOR IMAGE PROCESSING APPARATUS

(75) Inventor: Eiichi Hayashi, Saitama (JP)

(73) Assignee: Fujinon Corporation, Saitama (JP)

( * ) Notice: Subject to any disclaimer, the term of this patent is extended or adjusted under 35 U.S.C. 154(b) by 899 days.

(21) Appl. No.: 10/232,390

(22) Filed: Sep. 3, 2002

(65) Prior Publication Data

US 2003/0063330 A1    Apr. 3, 2003

(30) Foreign Application Priority Data

Sep. 28, 2001 (JP) .............................. 2001-304466

(51) Int. Cl.
*H04N 1/04* (2006.01)
(52) U.S. Cl. ...................... 358/497; 358/494; 358/474; 358/471; 358/487; 358/505; 358/506
(58) Field of Classification Search ................ 358/497, 358/494, 474, 471, 487, 505, 506
See application file for complete search history.

(56) References Cited

U.S. PATENT DOCUMENTS

| | | |
|---|---|---|
| 5,816,969 A | 10/1998 | Tsai |
| 5,992,969 A | 11/1999 | Arminana Terrasa et al. |
| 6,004,050 A | 12/1999 | Rehman et al. |
| 6,137,106 A | 10/2000 | Kao |
| 6,762,864 B1 * | 7/2004 | Kao ............................ 358/497 |

FOREIGN PATENT DOCUMENTS

| | | |
|---|---|---|
| DE | 28 12 588 | 9/1978 |
| JP | 2-125565 | 5/1990 |
| JP | 10-257251 | 9/1998 |
| JP | 2001-92042 | 4/2001 |
| JP | 2001-100326 | 4/2001 |
| JP | 2001-337400 | 12/2001 |

* cited by examiner

*Primary Examiner*—David Moore
*Assistant Examiner*—Houshang Safaipour
(74) *Attorney, Agent, or Firm*—Arnold International; Clyde I. Coughenour; Bruce Y. Arnold

(57) ABSTRACT

Support structure is disclosed for an image processing apparatus having a carriage that is scanned in order to read or print a document. Support brackets for attaching tension members, such as wire ropes, to each side of the carriage are formed by bending a flat plate to create an attachment plate portion of a bracket that is mounted on the carriage, a vibration absorbing arm, and a clamping extension. A wire rope is clamped to each clamping extension so that the carriage may be moved by the wire ropes. The width, length and thickness of the support brackets are selected to reduce vibrations, according to the speed and characteristics of the carriage, and at least the length dimension of the bracket may be readily adjusted. Also, vibration dampers may be used between the attachment plate portion of the bracket and the carriage.

15 Claims, 14 Drawing Sheets

CARRIAGE SUPPORT STRUCTURE FOR IMAGE PROCESSING APPARATUS

BACKGROUND OF THE INVENTION

1. Field of the Invention

The present invention relates to a carriage support structure for an image processing apparatus. The carriage support structure links a carriage to a tensioning member such as a wire rope, fabric or ribbon that has a high tensile strength and exhibits minimal stretching under the loads imposed in moving the carriage. The tensioning member is driven by a motor so as to move the carriage along a document containing either picture or text data for scanning the document, or for printing such data onto a blank document by a scanning process.

2. Description of Related Art

In an image reading apparatus that reads an image of a document from a sheet of paper and processes it, as with a copier or a scanner, a document is illuminated by a light source, such as a fluorescence lamp, and reflected light is received by a light receptor that is provided with an imaging lens and a photoelectric converter, such as a CCD. The imaging lens forms images onto the photoelectric converter, and mirrors are commonly used to guide the light that is reflected from the document to the light receptor. In an image reading apparatus in which the document is maintained in a fixed position, a mirror is moved along the document so that the optical path length, from the document to the light receptor, remains substantially constant while the illumination point shifts.

An example of an image reading apparatus is illustrated in FIGS. 13 and 14. FIG. 13 is a schematic perspective view of an image reading apparatus 1 on which a document is placed. The image reading apparatus includes a housing 2 having a lengthwise wall 2a on the inner surface of which two shelf-like guide plates 2b and 2e are held. A full-traverse carriage 3 and a half-traverse carriage 4 are mounted on the guide plates 2b and 2e, respectively. The carriages move in the lengthwise direction of the housing 2. The top surface of the housing 2 is covered with a platen, not shown, that is preferably made of glass and on which a document to be scanned is placed. A lamp 5, such as a fluorescent lamp, is mounted on the full-traverse carriage 3 for illuminating the document. A light receptor 20 formed of an imaging lens 6 and a photoelectric converter 7, such as a CCD, is provided in an appropriate position on a bottom plate 2c on the housing 2. A first mirror, not shown, is provided on the full-traverse carriage 3, and second and third mirrors, not shown, are provided on the half-traverse carriage 4. Light from the lamp 5 that has been reflected from the document is sequentially reflected from the first, second, and third mirrors before passing though the imaging lens 6 and entering the photoelectric converter 7. The first, second, and third mirrors define an optical path from the document to the photoelectric converter 7.

In order to obtain image information from the document, nearly the entire surface of the document has to be illuminated; therefore, the full-traverse carriage 3 is moved over nearly the entire platen. The optical path should be of a constant length while the full-traverse carriage 3 moves. To do this, the half-traverse carriage 4 moves one-half the rate of the full-traverse carriage 3 and in synchronism with it so that the optical path remains constant.

FIG. 14 is a schematic perspective view of the driving mechanism for synchronizing the movement of the carriages. A drive axis 8 is rotatably supported at one end of the housing 2 with its axis orthogonal to the scanning direction of the carriages and with a drive pulley 8a attached in the center. A motor 9 is provided on the bottom plate 2c of the housing 2. A drive pulley 9a is attached to the power axis of the motor 9. A first drive belt 11a runs over the drive pulley 9a and a first middle pulley 10a. A second drive belt 11b runs over a second middle pulley 10b integrally molded to the first middle pulley 10a and over the drive pulley 8a. In this way, the rotation power of the motor 9 is transmitted to the drive pulley 8a so that the drive axis 8 rotates at a lower speed than the motor. This results in a smooth rotation of the drive axis 8 and significantly reduces vibrations transferred to the carriages while they are being moved by the drive axis 8. Reduced vibrations are especially advantageous when downsizing the image processing apparatus. Take-up pulleys 13 are provided at both ends of the drive axis 8. The center of a tensioning member, such as a wire rope 14, is wound an appropriate number of turns around the take-up pulley 13. A pair of coaxial guide pulleys 15 and 16 are rotatably supported on the side of the half-traverse carriage 4 with their axis orthogonal to the scanning direction. At the opposite end of the housing 2 from the drive axis 8, a guide pulley 17 is rotatably supported with its axis orthogonal to the scanning direction. A bracket 2d is provided in an appropriate position on the wall 2a of the housing 2. A take-up pulley 13, a wire rope 14, guide pulleys 15, 16, and 17, and a bracket 2d are arranged on each side of the scanning region of the carriages inside the housing 2. The wire rope 14 has one end fixed to the bracket 2d and is then wound half-way around the guide pulley 16. The wire rope is then attached to the full-traverse carriage 3 by a linkage 18. The wire rope 14 then passes several times around the take-up pulley 13, passes half-way around the pulley 17 which is fixed in position relative to the housing 2, and then half-way around the guide pulley 15. The other end of the wire rope 14 then attaches to one end of a spring 19, which may be shaped as a coil. The other end of the spring 19 is attached to a sidewall of the housing 2. The linkage 18 includes a tongue 18a which projects from a base plate that forms the full-traverse carriage 3, and a screw 18b which may be threaded into the linkage 18. The wire rope 14 is clamped by the screw 18b and the tongue 18a so as to attach the wire rope 14 to the full-traverse carriage 3. Examples of the linkage structure between the full-traverse carriage 3 and wire rope 14 include the carriage fixing mechanism described in Japanese Laid-Open Patent No. 2001-092042. The linkage structure is designed to apply appropriate tension to the wire rope 14.

Japanese Laid-Open Patent No. 2001-100326 describes a photograph print apparatus that is an image reproduction scanning apparatus for forming images on a sensitized material. The photograph print apparatus projects light, including image data, onto a sensitized material in order to form an image on the sensitized material. A carriage mechanism is used to move the point from which light is projected.

BRIEF SUMMARY OF THE INVENTION

High performance processing requires high carriage speeds. However, with high carriage speeds, vibrations produced by a motor which drives the carriage are transmitted to the carriage. Such vibrations degrade the image data that is acquired, in the case of image reading, or degrade the quality of a printed image, in the case of image writing using a scanning process. It has been found that, as the carriage speeds increase, the transmission of vibrations from the motor to the carriage is significantly reduced by increasing the width of a linkage member that links the carriage to the tension member. Thus, exchangeable linkage members enable reduced vibrations to be maintained when the carriage speed is changed.

Recently, high optical performance has come to be demanded in image processing of documents while, simultaneous with this requirement, a high speed of image reading and writing has also come to be demanded. Attempts have been made in the past to move the carriage faster. However, the faster the carriage moves, the more sensitive it is to vibrations caused by the drive motor. Even if these vibrations are so small that they appear at first to be insignificant, these vibrations are often responsible for unacceptable data reproduction in reading or writing a document. Studies on stable data acquisition conducted by the present inventor have revealed that the width of the tongue 18a can be adjusted to reduce vibrations that are transmitted to the carriage. It has also been found that the width of the tongue 18a should be varied in order to absorb vibrations according to different motor rotation rates or different speeds of carriage movement.

The object of the present invention is to provide a carriage support structure for an image processing apparatus in which vibrations caused by the drive motor are not transmitted to the carriage even when the specified carriage speed differs due to image processing rates or machine types and applications.

As a technical means to attain this objective, the carriage support structure for an image processing apparatus of the present invention is one in which a carriage, carrying an optical scanning member, is moved by a drive motor along a document. The carriage support structure is used to fix the carriage to a tension member that links the carriage to the drive motor. A support bracket is detachably attached onto the carriage; and the tension member is attached to the support bracket. Various features of the present invention provide vibration isolation and damping of vibrations which travel from the motor via the tension member and support bracket, as will be discussed in detail below.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 13:
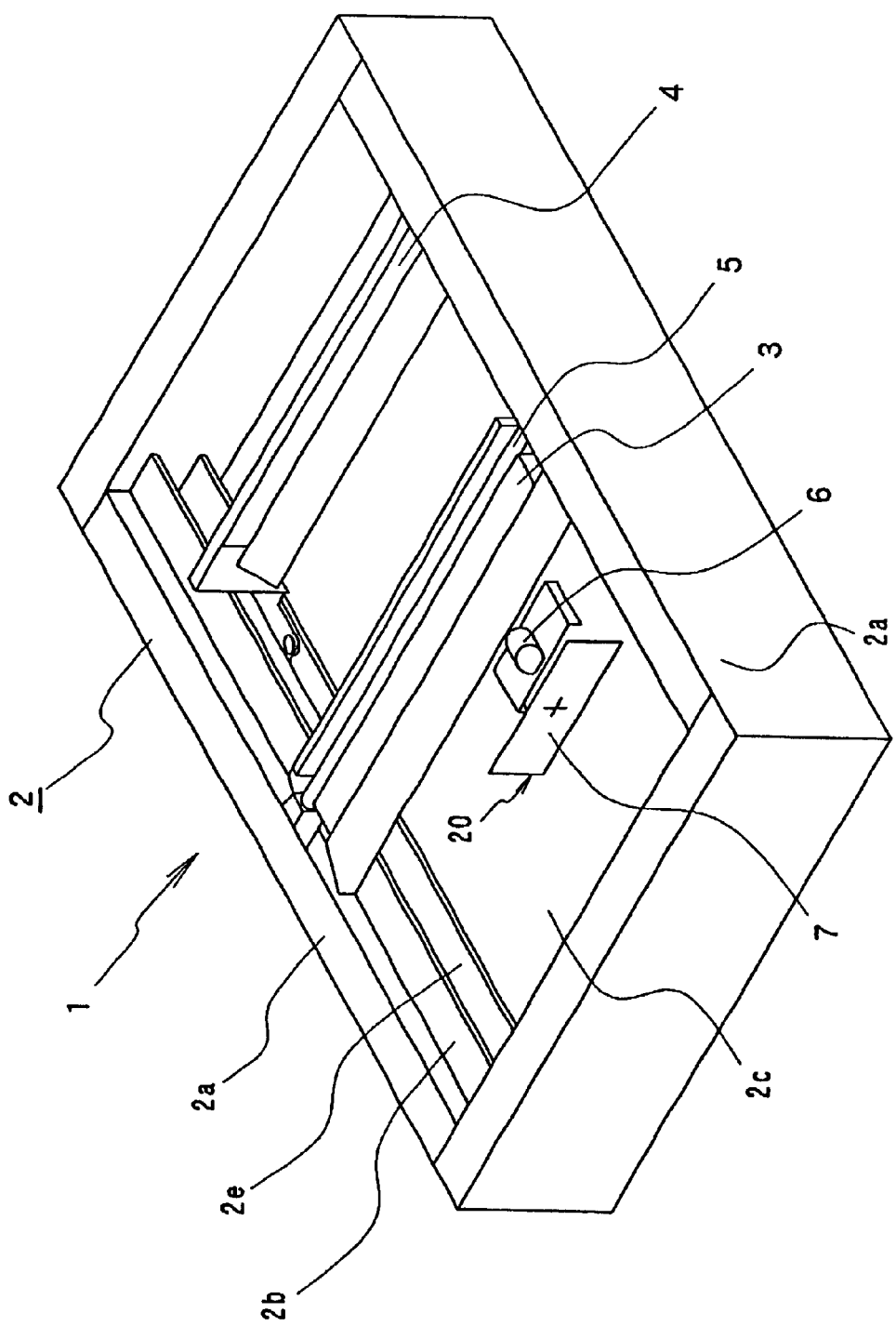
FIG. 13 is a schematic perspective view showing an image reading apparatus of a different invention.
Figure 14:
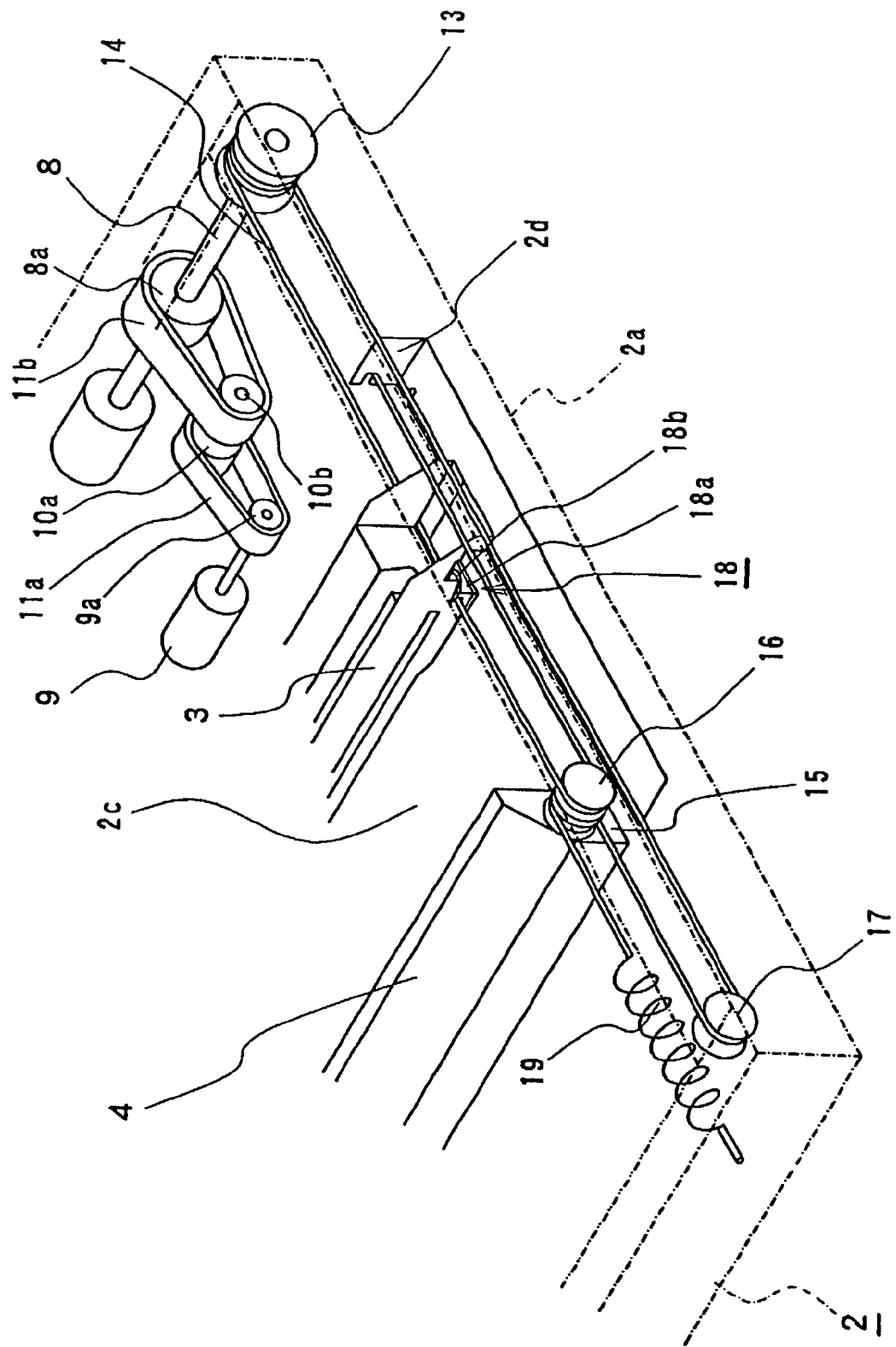
FIG. 14 is a schematic perspective view showing a carriage driving mechanism of the image reading apparatus shown in FIG. 13 that may be modified to use the carriage support structure of the present invention.

Various embodiments of the carriage support structure for the image processing apparatus of the present invention will now be described with reference to the drawings. An example of an image processing device that may use the carriage support structure of the present invention is shown in FIGS. 13 and 14. The image processing apparatus in each of Embodiments 1–6 below involves an image reading apparatus in which a light source carried by a carriage is moved to illuminate a document, and reflected light is used to read image data on the document.

Embodiment 1

Figure 1:
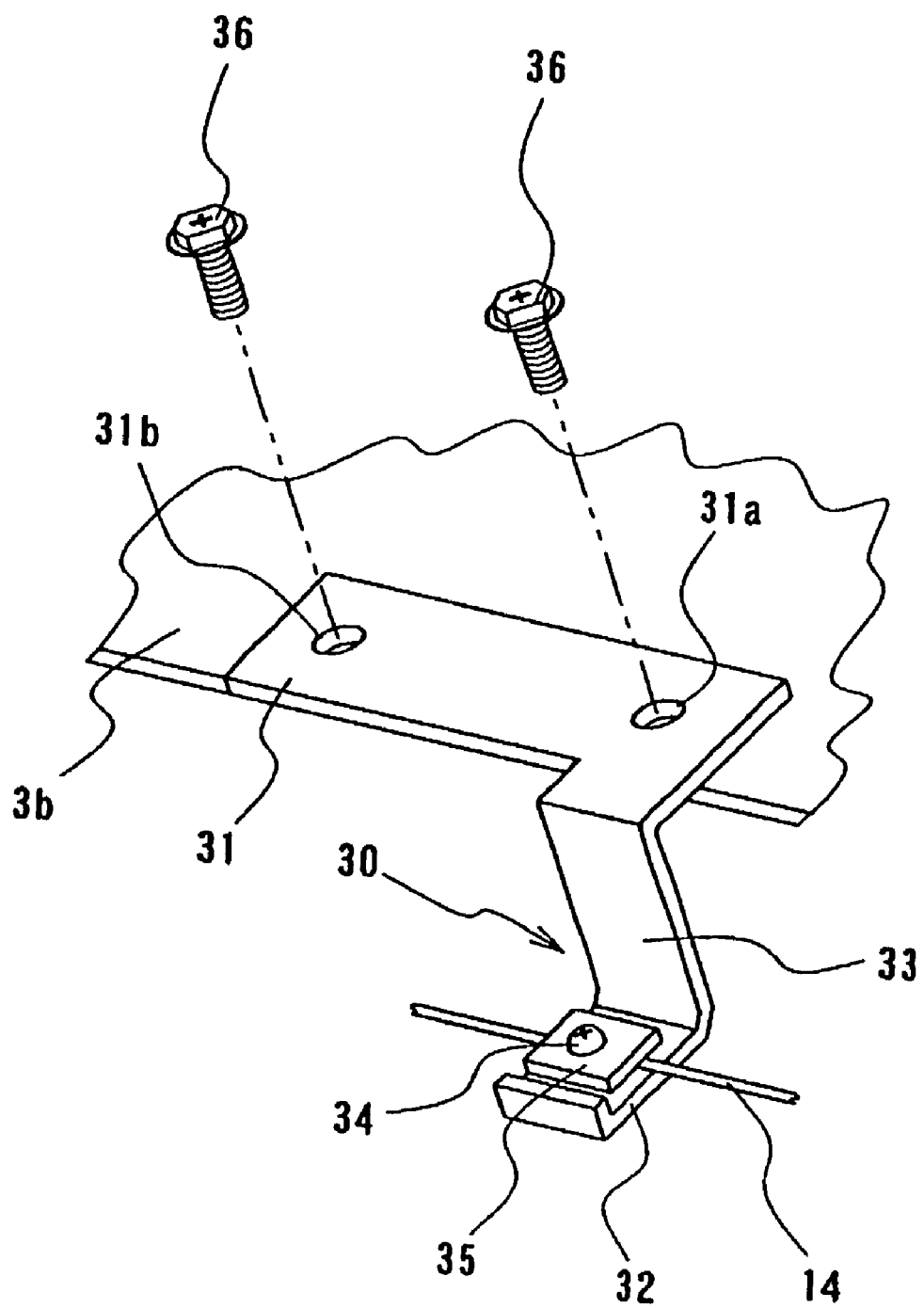
FIG. 1 is a perspective view of a first embodiment of the carriage support structure for an image processing apparatus showing the carriage being driven by a wire rope via a support bracket.
Figure 2:
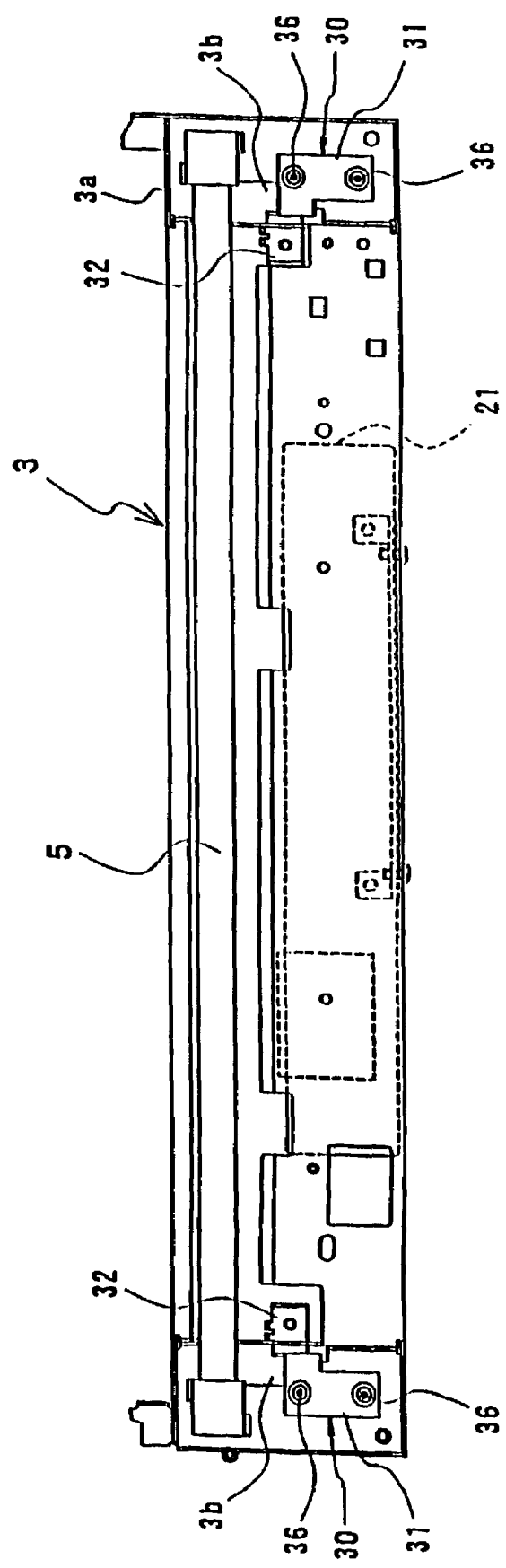
FIG. 2 is a plan view of the full-traverse carriage driven by the wire rope using the support structure of FIG. 1.

FIGS. 1 and 2 show a first embodiment of the carriage support structure of the present invention. FIG. 1 is a perspective view of the support structure and FIG. 2 is a plan view of the full-traverse carriage 3 reciprocated by a wire rope or other tension member on the support structure. The full-traverse carriage 3 is provided with a frame 3a, a lamp 5, a driving circuit 21, and a first mirror (not shown). A support bracket 30 is mounted on the bottom plate 3b of the frame 3a. The tension member is not restricted to a wire rope, as other mechanisms such as a fabric belt, synthetic webbing, or chain may be used instead.

The support bracket 30 is formed of three portions, namely, an attachment plate 31 that is used to attach the support bracket to the bottom plate 3b, a clamping extension 32 with which a wire rope 14 is secured to the support bracket 30, and a vibration absorbing arm 33 that is attached at one end to the support bracket so that is extends as a cantilever from the support bracket 30 and that joins the attachment plate 31 to the clamping extension 32. The attachment plate 31 has a substantially rectangular shape, with its length parallel to the direction of the wire rope 14, and with two through-holes 31a and 31b formed appropriately apart from each other in the lengthwise direction. The bottom plate 3b has female threads that coincide with the through-holes 31a and 31b when the attachment plate is mounted on the bottom plate 3b using screws 36.

The vibration absorbing arm 33, formed or bent substantially orthogonally downwardly at one end of the attachment plate 31, has an appropriate width. The clamping extension 32 is formed at the lower tip of the vibration absorbing arm 33. The clamping extension 32 protrudes substantially orthogonally outwardly from the vibration absorbing arm 33, in the opposite direction from that of the attachment plate 31, and has nearly the same width as the vibration absorbing arm 33. A small portion of the leading edge of the clamping extension 32 is bent upwardly, in a direction parallel to the vibration absorbing arm 33, to help secure a square clamping washer 35 in place. Female threads are formed substantially at the center of the clamping extension 32 and a wire clamp fixing screw 34 is screwed into the female threads. The square clamping washer 35 is inserted and the wire rope 14 is placed between the square clamping washer 35 and clamping extension 32 before the wire clamp fixing screw 34 is screwed into the female threads. The wire clamp fixing screw 34 is then tightened in order to clamp the wire rope 14 onto the clamping extension.

The support bracket 30 can be formed by bending a flat plate having an appropriate size and thickness into the attachment plate, arm and clamping extension. The plate width is selected to accommodate the speed of the full-traverse carriage 3 or rotation rate of the motor 9. As described above, an appropriate width of the support bracket 30 tends to reduce vibrations transmitted to the full-traverse carriage 3 through the wire rope 14. One support bracket 30 can be replaced by another having a different width to accommodate the speed of the carriage 3. This provides a simple adaptation to different types of image reading apparatuses while ensuring reduced vibrations. Vibration absorbing arm 33 not only serves to absorb vibrations, but also it serves to place the carriage 3 and wire rope 14 at different levels, which is useful in order to maintain appropriate tension on the wire rope 14 so as to reduce transmitted vibrations.

Embodiment 2

Figure 3:
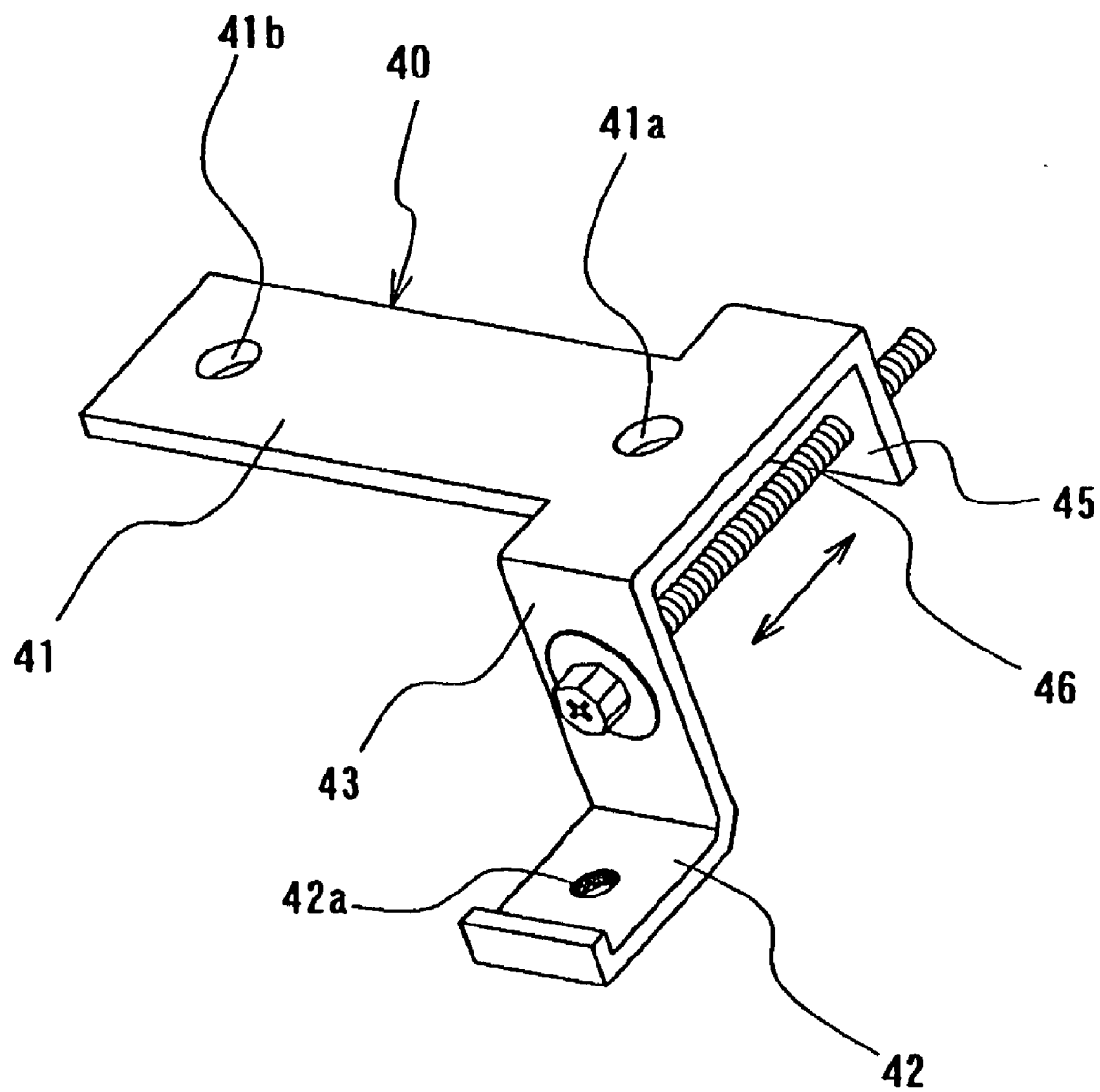
FIG. 3 is a perspective view of a second support bracket embodiment.
Figure 4:
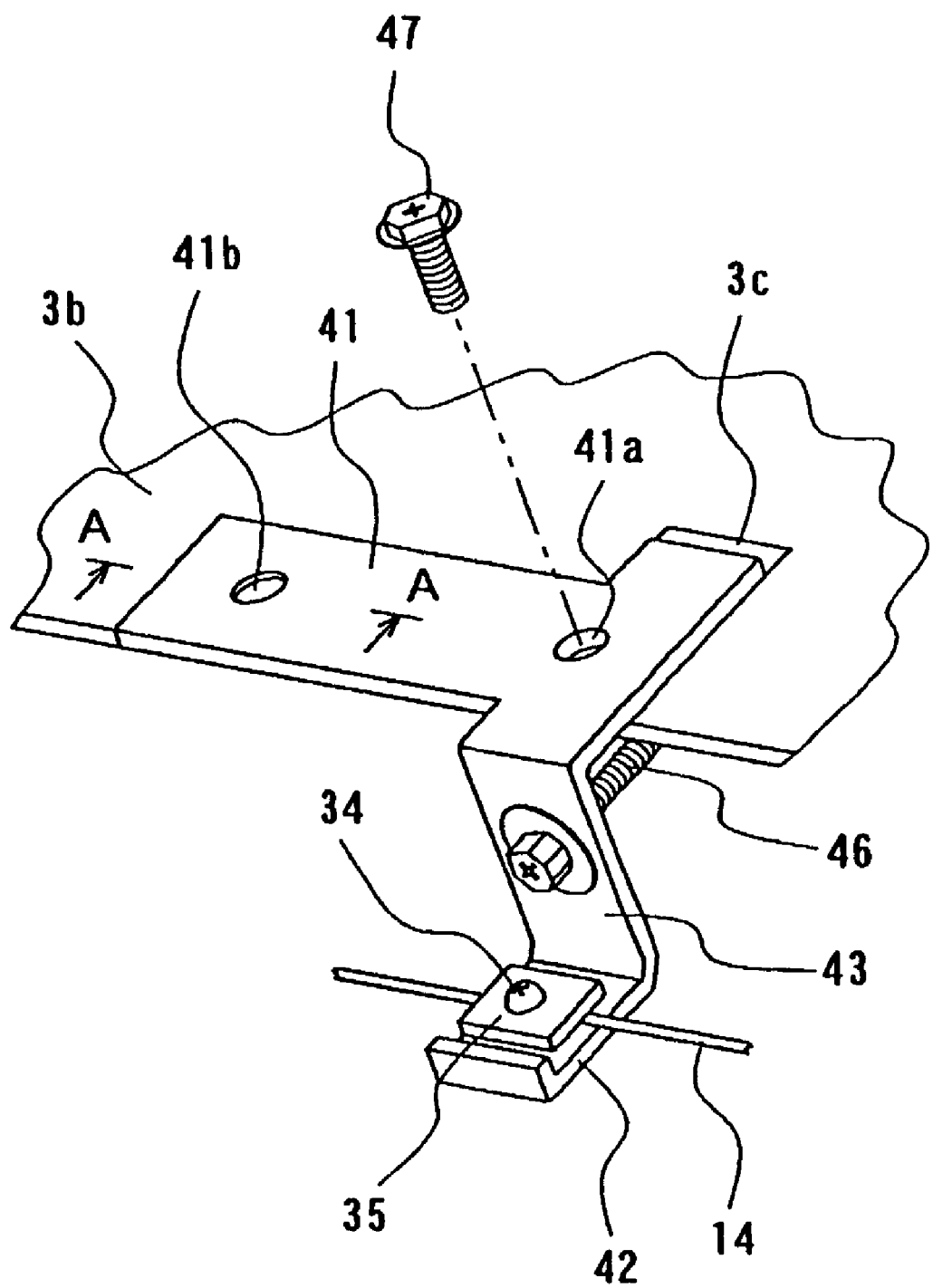
FIG. 4 is a perspective view of the carriage driven by the wire rope support bracket of FIG. 3.
Figure 5:
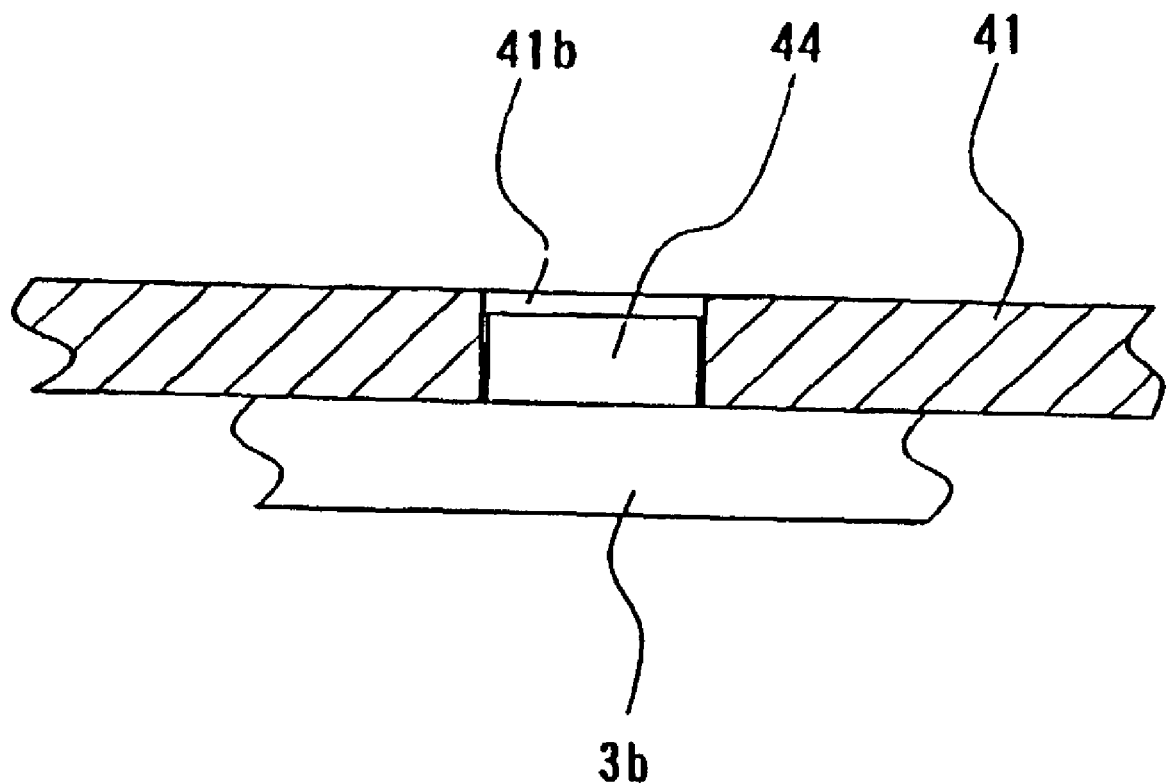
FIG. 5 is a partial sectional view along the line A—A in FIG. 4.

FIGS. 3 to 5 show a second embodiment of the support structure of the present invention. The attachment plate 31 and clamping extension 32 can be joined without the specific vibration absorbing arm 33. FIG. 3 is a perspective view of a support bracket 40 and FIG. 4 is a perspective view of the support bracket 40 shown securing the full-traverse carriage to the wire rope 14. FIG. 5 is a partial sectional view along the line A—A in FIG. 4. The support bracket 40 of this embodiment is similar to the support bracket 30 of the first embodiment. An attachment plate 41, a clamping extension 42, and a vibration absorbing arm 43 are formed by bending a flat plate. The wire clamp fixing screw 34 is screwed into female threads 42a formed in the clamping extension 42 with the square clamping washer 35 in-between to clamp the wire rope 14.

The attachment plate 41 has two through-holes 41a and 41b formed appropriately apart from each other. An adjustment plate (hereinafter termed an 'adjustment flap') 45 is formed at the opposing side of and nearly parallel to the vibration absorbing arm 43. Female threads are formed in the adjustment flap 45. The vibration absorbing arm 43 has a through-hole at the position corresponding to the female threads. An adjustment screw 46 passes through the through-hole in the vibration absorbing arm 43 and is screwed into the female threads in the adjustment flap 45. The bottom plate 3b of the full-traverse carriage 3 has female threads at the position coincidental with the through-hole 41a and a projection 44 at the position coincidental with the through-hole 41b of the attachment plate 41 as shown in FIG. 5. As seen in FIG. 4, a sufficiently large slot 3c is formed in the bottom plate to accommodate the adjustment flap 45. The attachment plate 41 of the support bracket 40 is attached with the adjustment flap 45 inserted through the slot 3c and the projection 44 is positioned in the through-hole 41b. The through-hole 41a is aligned with the female threads in the bottom plate 3b. A mounting screw 47 is inserted in the through-hole 41a and screwed into the female threads of the bottom plate 3b to attach the support bracket 40 to the full-traverse carriage 3.

The clamping extension 42 and the square clamping washer 35 are used to secure the wire rope 14 to the full-traverse carriage 3. An adjustment screw 46 is inserted into the through-hole of the vibration absorbing arm 43 and screwed into the female threads of the adjustment flap 45. The adjustment screw 46 can be tightened to modify the distance between the adjustment flap 45 and the vibration absorbing arm 43. The adjustment flap 45 and the vibration absorbing arm 43 are appropriately deflected from their normal, unstressed state by applying a stress to the support bracket 40 and hence adjusting the tension in the wire rope 14. This stress serves to absorb vibrations caused by the motor 9 that are transmitted through the wire rope 14. The adjustment screw 46 can be loosened or tightened to modify the stress applied to the adjustment flap 45 and the vibration absorbing arm 43. This simple operation allows significant vibration reduction, depending on the speed of the full-traverse carriage 3. While the adjustment means of the second embodiment consists of the adjustment screw 46 being screwed into the female threads formed in the adjustment flap 45, a similar through-hole to that of the vibration absorbing arm 43 can also be formed in the adjustment flap 45, through which an adjustment screw is passed. Then, the projecting end of the adjustment screw can be screwed into a wing-nut. The wing-nut can be tightened to deflect the vibration absorbing arm 43 and/or the adjustment flap 45. Other known fasteners may be used as well for the adjustment means, as will be immediately apparent to those of ordinary skill in the art.

Embodiment 3

Figure 6:
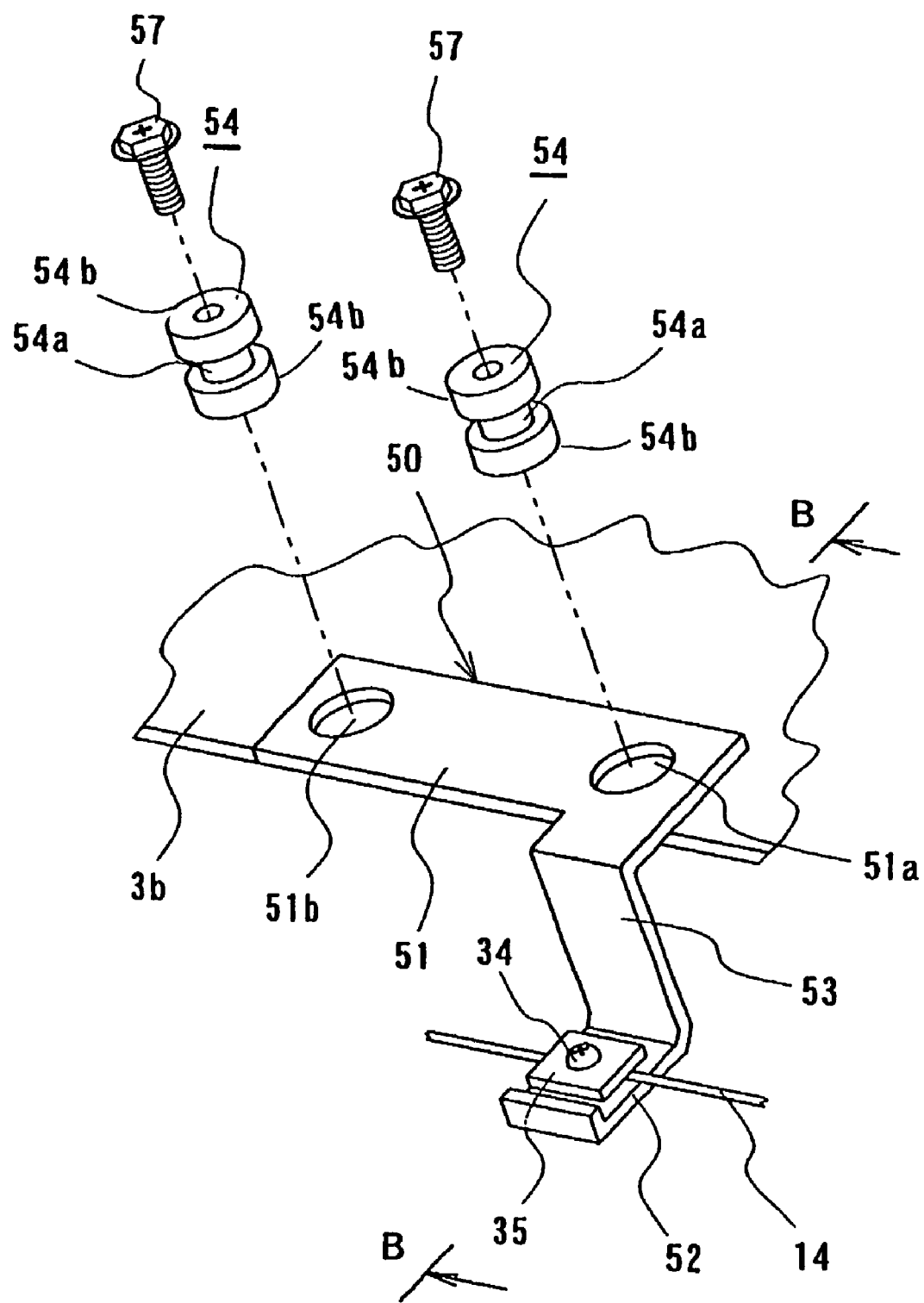
FIG. 6 is a perspective view of the carriage driven by the wire rope using a third support bracket embodiment.
Figure 7:
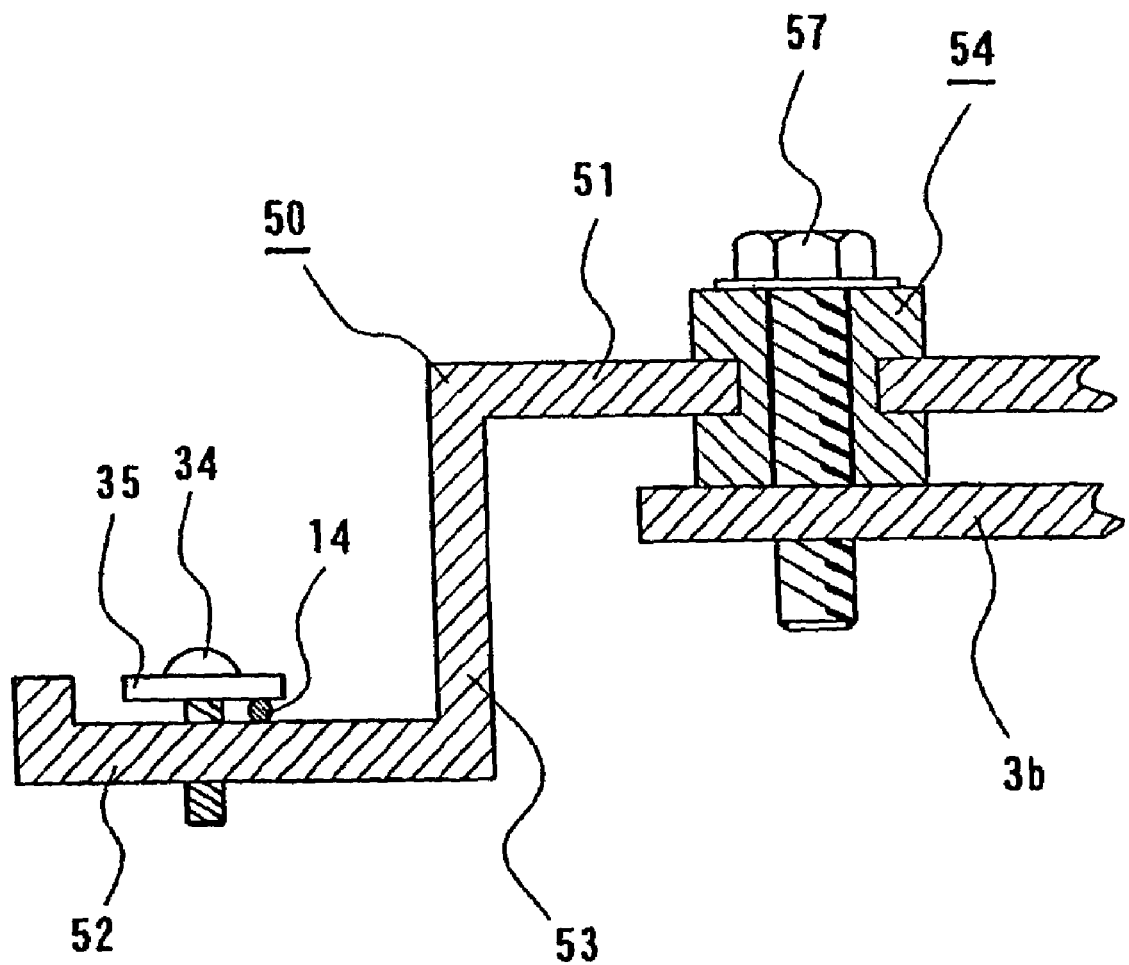
FIG. 7 is a partial sectional view along the line B—B in FIG. 6.

FIGS. 6 and 7 show a third embodiment of the carriage support structure of the present invention. FIG. 6 is a perspective view and FIG. 7 is a partial sectional view along the line B—B in FIG. 6. A support bracket 50 of this embodiment also consists of an attachment plate 51, a clamping extension 52, and a vibration absorbing arm 53, which can be formed by bending a flat plate. The wire clamp fixing screw 34 is screwed into female threads formed in the clamping extension 52 with the square clamping washer 35 in-between in order to clamp the wire rope 14 onto the full-traverse carriage. The attachment plate 51 has two through-holes 51a and 51b for fasteners. Female threads are formed at the corresponding positions to the through-holes 51a and 51b in the bottom plate 3b for fasteners so as to mount the attachment plate 51 on the bottom plate 3b of the full-traverse carriage 3. As seen in FIGS. 6 and 7, vibration dampers 54 (preferably made of rubber) are provided in the through-holes 51a and 51b in order to absorb vibrations. The vibration damper 54 has a cylindrical body 54a with flanges 54b extending outwardly at both ends. The outer diameter of the body 54a is nearly equal to the inner diameter of the through-holes 51a and 51b. The inner diameter of the body 54a is large enough to pass a mounting screw 57 that is screwed into the female threads of the bottom plate 3b. The vibration damper is resilient enough to have the flanges 54b pushed through the through-holes 51a and 51b without difficulty. To mount the support bracket 50 of the third embodiment onto the full-traverse carriage 3, the vibration dampers 54 are fitted in the through-holes 51a and 51b after which the mounting screws 57 are inserted in the vibration dampers 54 and screwed into the female threads formed on the bottom plate 3b. With the carriage support structure of the third embodiment, vibrations caused by the motor 9 and transmitted to the support bracket 50 by the wire rope 14 are cushioned by the vibration dampers 54 that extend between the support bracket and the bottom plate 3*b*, preventing transmission of the vibrations to the full-traverse carriage 3.

Embodiment 4

Figure 8:
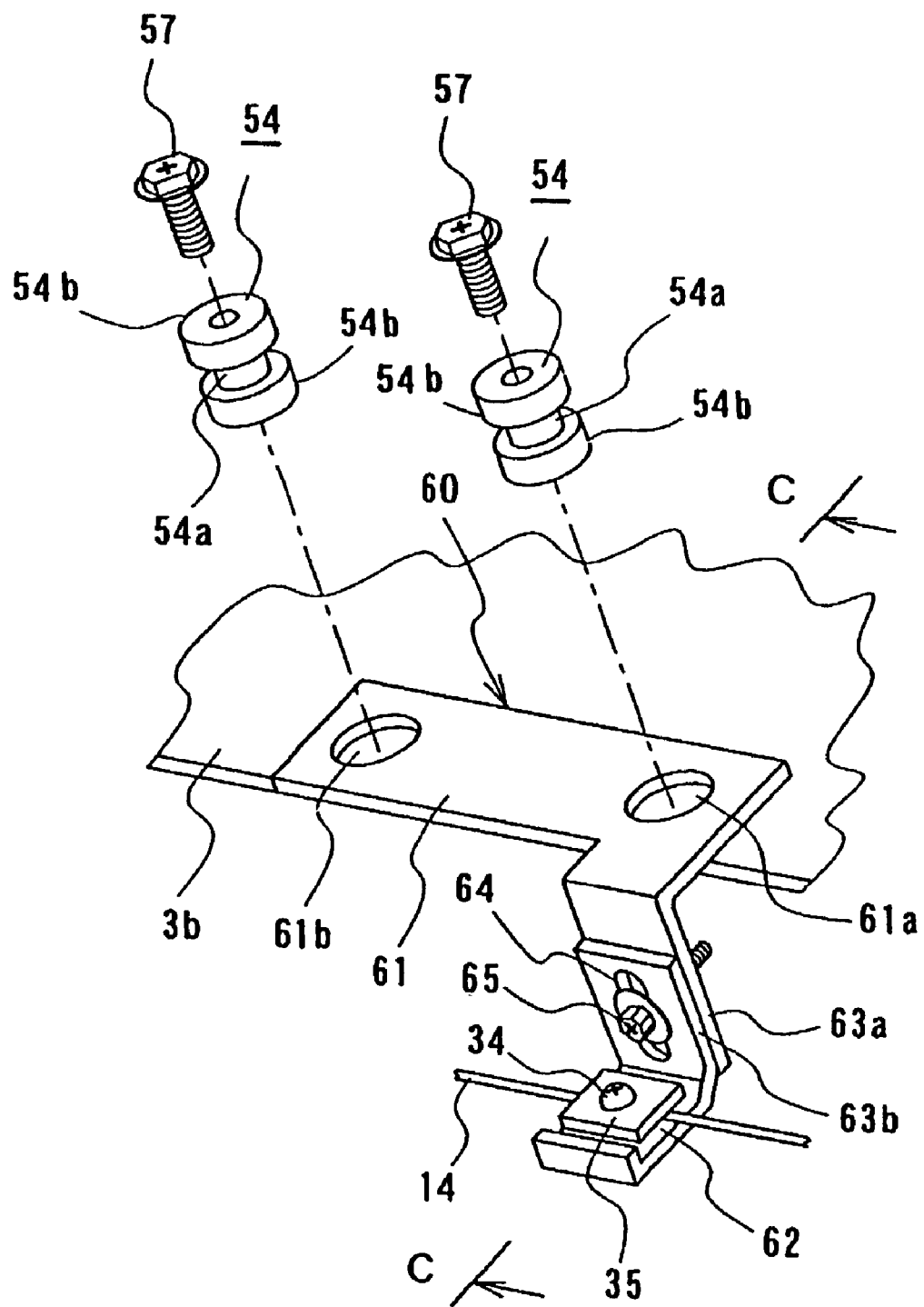
FIG. 8 is a perspective view of the carriage driven by the wire rope using a fourth support bracket embodiment.
Figure 9:
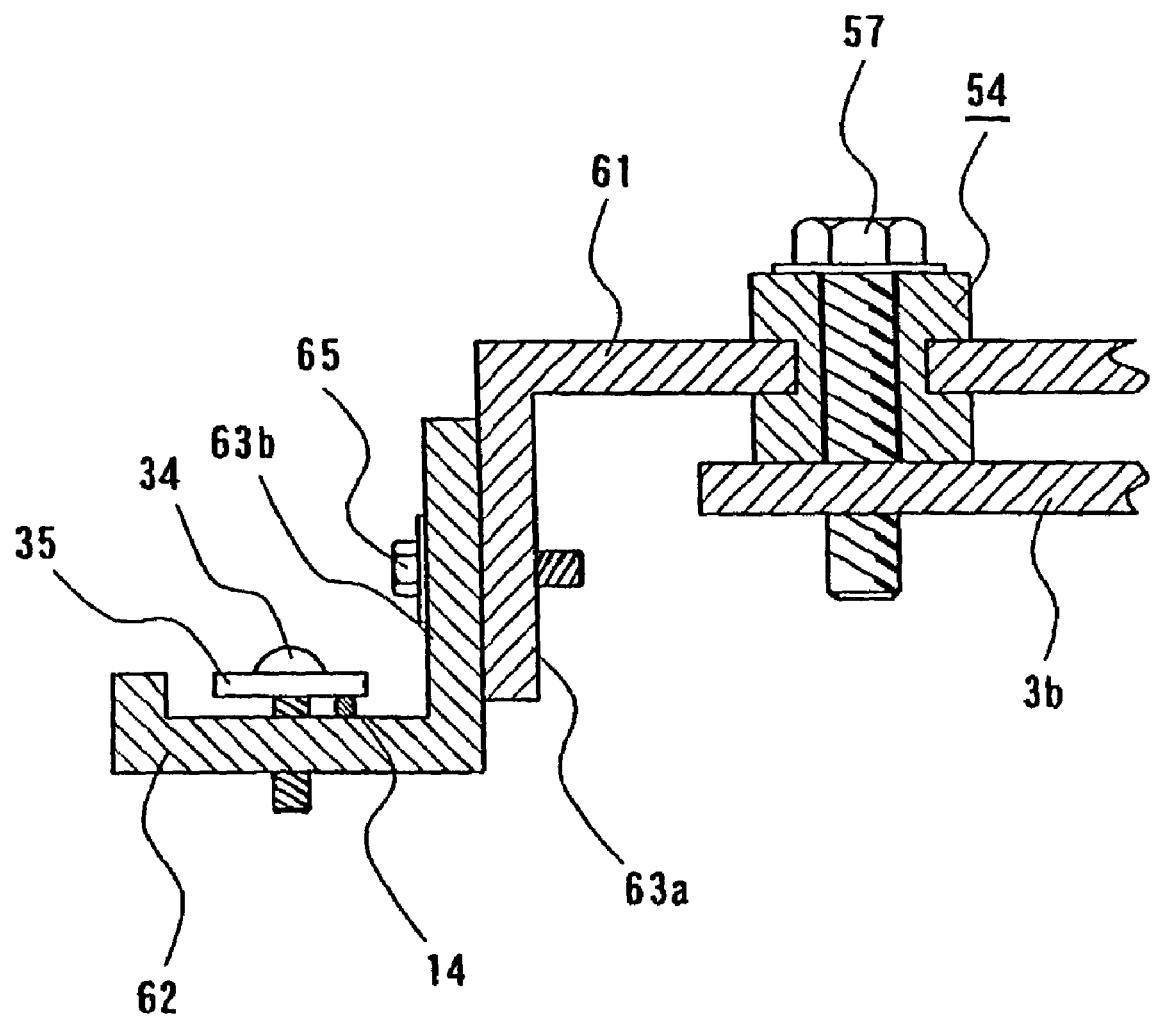
FIG. 9 is a partial sectional view along the line C—C in FIG. 8.
Figure 10:
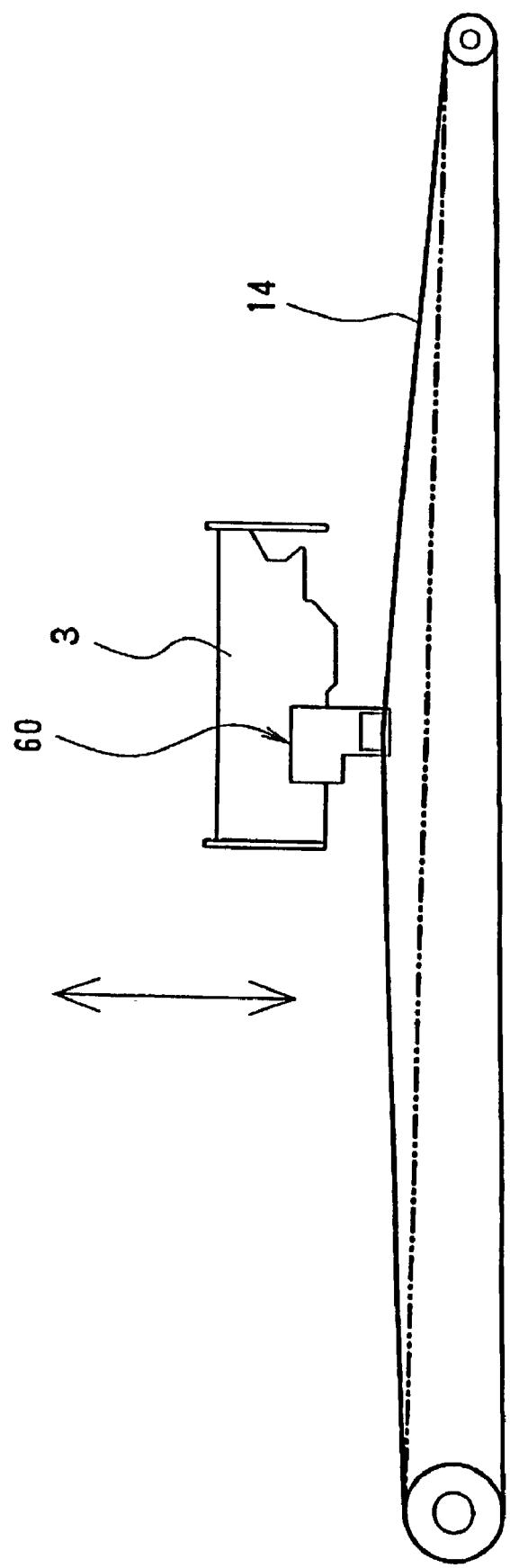
FIG. 10 is a schematic side view showing the relationship between the carriage and the wire rope.

FIGS. 8 to 10 show a fourth embodiment of the carriage support structure of the present invention. FIG. 8 is a perspective view and FIG. 9 is a partial sectional view along the line C—C in FIG. 8, and FIG. 10 is a schematic side view showing the relationship between the full-traverse carriage 3 and wire rope 14. The fourth embodiment uses a vibration absorbing arm similar to the vibration absorbing arm 33 in FIG. 1 in a divided form. A support bracket 60 comprises a vibration absorbing arm consisting of an adjustment arm 63*a*, formed as an integral component of attachment plate 61, that can be made by bending a flat plate, and a slide arm 63*b*, formed as an integral component of a clamping extension 62, that can be made by bending a flat plate. The vibration adjustment arm 63*a* and the slide arm 63*b* partially overlap. Female threads, not shown, are formed at an appropriate position in the adjustment arm 63*a*. An elongated slot 64 is formed in the slide arm 63*b* in the lengthwise direction of the slide arm. A threaded portion of the position adjustment screw 65 is inserted through the elongated slot 64 and screwed into the female threads of the adjustment arm 63*a* to secure the arms together.

As shown in FIGS. 8 and 9, the vibration dampers 54 are inserted in through-holes 61*a* and 61*b* of the attachment plate 61. Then, the attachment plate 61 is mounted on the bottom plate 3*b* of the full-traverse carriage 3 using the mounting screws 57. The wire clamp fixing screw 34 is screwed into the female threads in the clamping extension 62 with the square clamping washer 35 in-between. The wire clamp fixing screw 34 can be tightened to clamp the wire rope 14 between the square clamping washer 35 and the clamping extension 62.

In the carriage support structure of the fourth embodiment, the overlapping of the adjustment arm 63*a* and the slide arm 63*b* allows the distance between the wire rope 14 and bottom plate 3*b* to be adjusted. The adjustment screw 65 is inserted in the elongated slot 64 of the slide arm 63*b* and loosely screwed into the female threads in the adjustment arm 63*a*. In this state, the slide arm 63*b* can be moved relative to the adjustment arm 63*a*. As shown in FIG. 10, support bracket 60 of the full-traverse carriage 3 is appropriately positioned to properly tension the wire rope 14. The position adjustment screw 65, is then tightened to fasten the adjustment arm 63*a* and the slide arms 63*b* together. When properly tensioned, the wire rope 14 absorbs vibrations caused by the motor 9, reducing the vibrations transmitted to the full-traverse carriage 3 through the support bracket 60.

Embodiment 5

Figure 11:
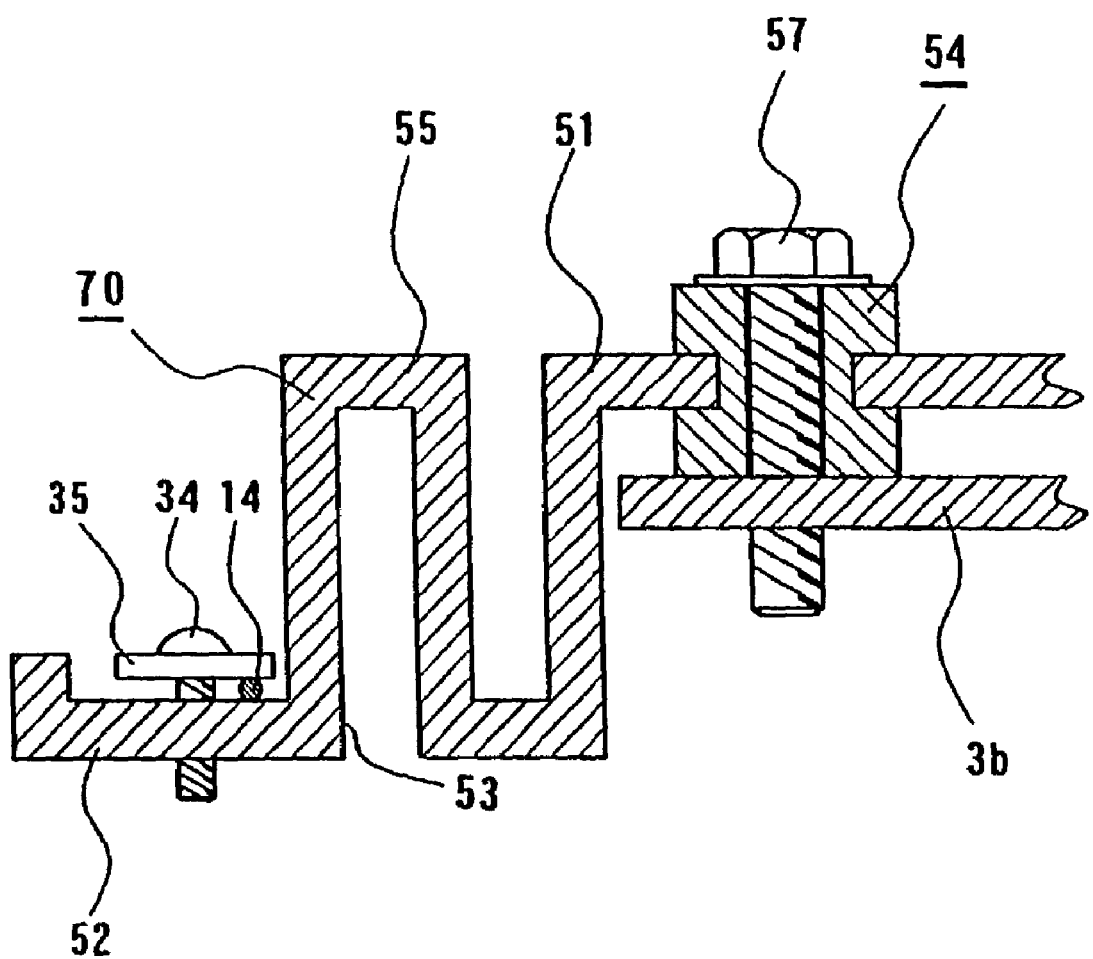
FIG. 11 is a first modification of the carriage support structure of FIG. 1.

FIG. 11 shows a first modification of the carriage support structure of the third embodiment. The same reference numbers as in the third embodiment are used, as much as possible, to indicate equivalent components. The support bracket 70 of this modification has a crank-shaped center component 55 added between the attachment plate 51 and the vibration absorbing arm 53. The center component 55 is modified to increase the total effective length of the arm 53 so that it has an increased length over which to absorb vibrations received from the wire rope 14, effectively preventing transmission of vibrations to the carriage 3. The crank-shaped component 55 elongates the vibration absorbing path by adding in an additional first section that is bent downward, a second section that is bent outward, a third section that is bent upward and a fourth section that is bent outward between the attachment plate 51 and the vibration absorbing arm 53.

Embodiment 6

Figure 12:
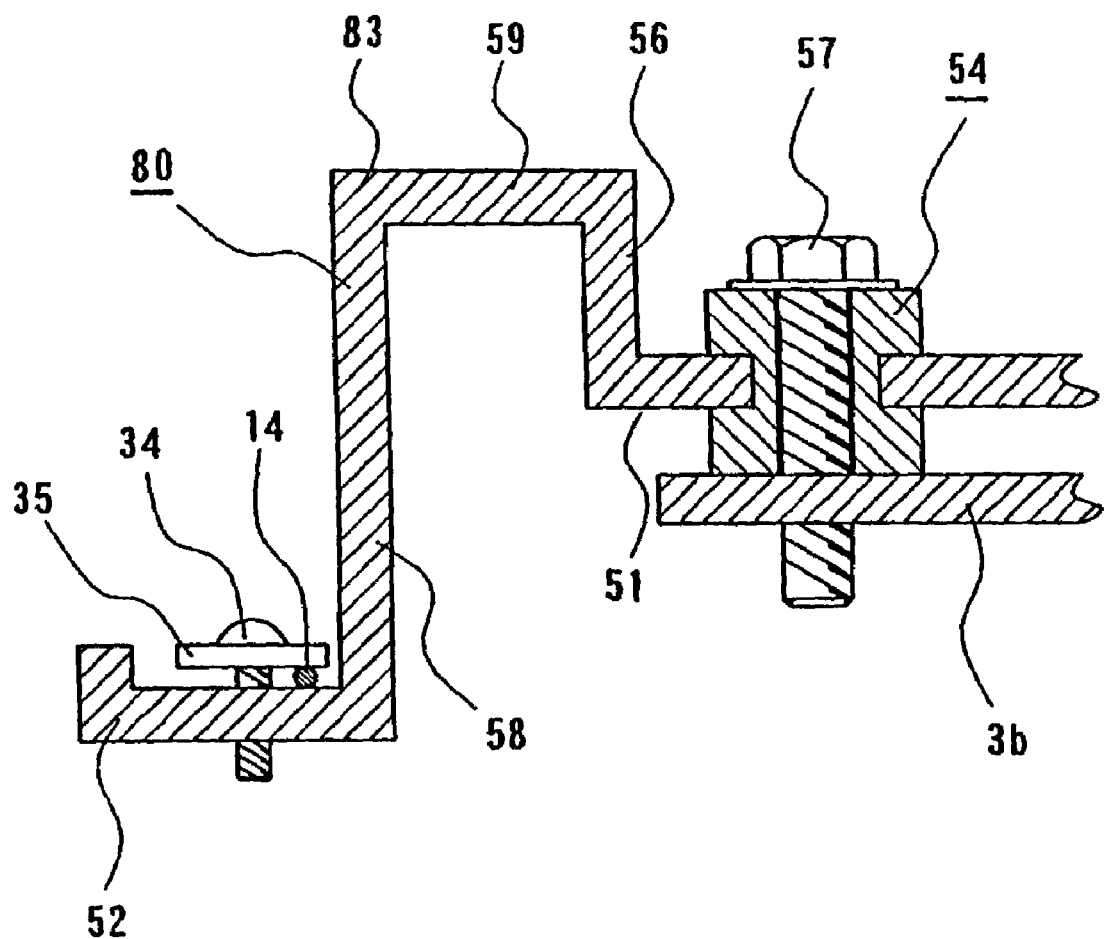
FIG. 12 is a second modification of the carriage support structure of FIG. 1.

FIG. 12 shows a second modification of the carriage support structure of the third embodiment. The same reference numbers as in the third embodiment are used as much as possible to indicate equivalent components. The support bracket 80 of this modification has an extended arm. The length of the vibration absorbing arm is extended from the attachment plate 51 of the support bracket by a first upward bend to form an ascending component 56, then outward to form a horizontal component 59, and finally downward to form a descending component 58 corresponding to the vibration absorbing arm 83. In this second modification, the arm 58 has an increased total length over that of the arm 53 shown in FIGS. 6 and 7, so that it appropriately absorbs more vibrations from the wire rope 14, and prevents their transmission to the carriage 3.

The support bracket, including the attachment plate, the vibration absorbing arm and the clamping extension, has a different thickness than that of the carriage. With a greater thickness, the bracket is more solid and resists bending and tension from the transmission member. The thickness of the support bracket can be adjusted to reduce vibration.

The invention being thus described, it will be obvious that the same may be varied in many ways. For example, in the embodiments described above, the carriage support structure is mounted on an image reading apparatus. However, the carriage support structure can be applied to an image writing apparatus, such as a photograph print apparatus, in which light including image data is projected onto a sensitized material. In this case, the carriage structure is used to move a point of light that is scanned so as to record image data onto the sensitized material. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. In an image processing apparatus in which a carriage carrying an optical scanning member is moved by a motor for scanning a document, and in which a carriage support structure is used to affix the carriage to a tension member that links the carriage to the motor, the improvements of the carriage support structure including:
    (a) a support bracket that is detachably attached to the carriage; and
    (b) the tension member being detachably attached to the support bracket, wherein
    a vibration damper is interposed between the support bracket and the carriage; and
    the support bracket includes a vibration absorbing arm attached at one end as a cantilever to a portion of the support bracket and at the other end to a member that engages the tension member.

2. In an image processing apparatus in which a carriage carrying an optical scanning member is moved by a motor for scanning a document, and in which a carriage support structure is used to affix the carriage to a tension member that links the carriage to the motor, the improvements of the carriage support structure including:

(a) a support bracket that is detachably attached to the carriage; and
(b) the tension member being detachably attached to the support bracket; wherein
the support bracket includes a vibration absorbing arm that is provided between a portion of the support bracket that is detachably attached to the carriage and a member that engages the tension member, and
an adjustment flap that protrudes in a direction that is parallel to the vibration absorbing arm is formed as part of the support bracket; and an adjustment means for varying the distance between the adjustment flap and the vibration absorbing arm is provided.

3. The improvements to an image processing apparatus as set forth in claim 2, wherein the adjustment means is formed of an adjustment screw that extends to the adjustment flap from the vibration absorbing arm and the adjustment screw can be loosened or tightened in order to apply a stress between, and thus vary a distance between, the adjustment flap and the vibration absorbing arm.

4. A carriage support structure for an image processing apparatus in which a carriage carrying an optical scanning member is moved by a motor along a document and the carriage support structure is used to affix the carriage to a tension member that links the carriage to the motor, said carriage support structure comprising:
a support bracket which includes a fixed portion that is detachably attached to the carriage, a vibration absorbing arm that extends as a cantilever from the support bracket, and a portion that attaches the vibration absorbing arm to the tension member, wherein a distance between the fixed portion and the portion that attaches the vibration absorbing arm to the tension member may be adjusted by flexing the vibration absorbing arm, thereby adjusting the tension of the tension member.

5. The carriage support structure for an image processing apparatus according to claim 4, wherein a vibration damper is interposed between the support bracket and the carriage.

6. The carriage support structure for an image processing apparatus according to claim 4, wherein the tension member is formed of a wire rope.

7. The carriage support structure for an image processing apparatus according to claim 4, wherein the support bracket and the carriage have different thicknesses.

8. In an image processing apparatus in which a carriage carrying an optical scanning member is moved by a motor for scanning a document, and in which a carriage support structure is used to affix the carriage to a tension member that links the carriage to the motor, the improvements of the carriage support structure including:
(a) a support bracket that is detachably attached to the carriage; and
(b) the tension member being detachably attached to the support bracket; wherein
a vibration damper is interposed between the support bracket and the carriage; and
the vibration damper has a cylindrical body with flanges extending outwardly at both ends of the cylinder.

9. A carriage support structure for an image processing apparatus having a carriage and a tension member that is used to move the carriage, said carriage support structure comprising:
a bracket that is detachably attachable to said carriage and includes a vibration absorbing arm that extends as a cantilever from an attachment plate portion of the bracket;
a clamping extension which extends substantially orthogonally from said vibration absorbing arm; and
a clamp on said clamping extension for attaching the tension member to the carriage.

10. The carriage support structure for an image processing apparatus as set forth in claim 9 wherein:
the bracket is attached to the carriage by threaded fasteners; and
the clamp includes a clamping washer.

11. The carriage support structure for an image processing apparatus as set forth in claim 9, wherein:
an adjustment flap extends downward from the attachment plate portion at a distance from the vibration absorbing arm so that the surface of the adjustment flap is substantially parallel to a surface of the vibration absorbing arm;
an adjustment means extends between said adjustment flap and the vibration absorbing arm so as to control a distance between a bottom portion of these surfaces.

12. The carriage support structure for an image processing apparatus as set forth in claim 11, wherein:
the adjustment means includes a shaft that passes through holes in the vibration absorbing arm and the adjustment flap;
said shaft has threads thereon that engage threads associated with said adjustment flap so as to deflect and thus adjust the distance between a bottom portion of said vibration absorbing arm and said adjustment flap so as to control the stress on said bracket.

13. The carriage support structure for an image processing apparatus as set forth in claim 11, wherein:
threaded fasteners attach the attachment plate portion of the bracket to the carriage; and a vibration absorbing damper is positioned between the attachment plate and the carriage.

14. The carriage support structure for an image processing apparatus as set forth in claim 13, wherein:
the vibration dampers are made of rubber in the form of a cylinder-shaped body with flanges that extend outwardly at both ends of the cylinder.

15. The carriage support structure for an image processing apparatus as set forth in claim 13, wherein:
the vibration absorbing arm is formed in two sections, namely, an adjustment arm and a slide arm that partially overlap so that the length of the vibration absorbing arm can be varied to thereby adjust the distance between the attachment plate portion of the bracket and the clamping extension, to thereby adjust the tension in the tension member.

* * * * *